US010171297B2

(12) United States Patent
Stewart et al.

(10) Patent No.: US 10,171,297 B2
(45) Date of Patent: Jan. 1, 2019

(54) MULTIVARIABLE CONTROLLER FOR COORDINATED CONTROL OF COMPUTING DEVICES AND BUILDING INFRASTRUCTURE IN DATA CENTERS OR OTHER LOCATIONS

(71) Applicant: Honeywell International Inc., Morris Plains, NJ (US)

(72) Inventors: Gregory E. Stewart, North Vancouver (CA); John A. Escargega, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 224 days.

(21) Appl. No.: 15/204,936

(22) Filed: Jul. 7, 2016

(65) Prior Publication Data

US 2018/0013620 A1    Jan. 11, 2018

(51) Int. Cl.
*H04L 12/24*   (2006.01)
*G06F 9/50*    (2006.01)
*H04L 29/08*   (2006.01)

(52) U.S. Cl.
CPC ........ *H04L 41/0813* (2013.01); *G06F 9/5094* (2013.01); *H04L 67/1097* (2013.01); *H04L 67/12* (2013.01)

(58) Field of Classification Search
CPC .. H04L 41/0813; H04L 67/1097; H04L 67/12
See application file for complete search history.

(56) References Cited

U.S. PATENT DOCUMENTS

| 5,351,184 | A  | 9/1994  | Lu et al. |
| 5,561,599 | A  | 10/1996 | Lu        |
| 5,572,420 | A  | 11/1996 | Lu        |
| 5,574,638 | A  | 11/1996 | Lu        |
| 5,758,047 | A  | 5/1998  | Lu et al. |
| 6,055,483 | A  | 4/2000  | Lu        |
| 6,122,555 | A  | 9/2000  | Lu        |
| 8,112,642 | B2 | 2/2012  | Bose et al. |

(Continued)

FOREIGN PATENT DOCUMENTS

WO    2009058880 A2    5/2009

OTHER PUBLICATIONS

Luca Parolini, "Models and Control Strategies for Data Center Energy Efficiency," Thesis, Feb. 2012, 192 pages, publisher Carnegie Mellon University, Pittsburgh, PA.

(Continued)

*Primary Examiner* — Brian J. Gillis
*Assistant Examiner* — Chhian (Amy) Ling

(57) ABSTRACT

A method includes obtaining first information associated with control of multiple computing devices, where the first information relates to possible changes to processing tasks performed by the computing devices. The method also includes obtaining second information associated with building infrastructure operations performed by one or more building systems of one or more buildings that house the computing devices. The method further includes identifying one or more changes to one or more of the computing devices using the first and second information. In addition, the method includes outputting third information identifying the one or more changes.

16 Claims, 5 Drawing Sheets

(56) References Cited

U.S. PATENT DOCUMENTS

| | | | |
|---|---|---|---|
| 8,621,248 B1 | 12/2013 | Weber et al. | |
| 8,645,733 B2 | 2/2014 | Kansal et al. | |
| 2003/0056126 A1* | 3/2003 | O'Connor | G06F 1/263 |
| | | | 713/300 |
| 2004/0236472 A1 | 11/2004 | Junk et al. | |
| 2005/0102544 A1 | 5/2005 | Brewer et al. | |
| 2011/0022868 A1 | 1/2011 | Harchol-Balter et al. | |
| 2011/0078467 A1 | 3/2011 | Hildebrand | |
| 2011/0173467 A1 | 7/2011 | Vaidyanathan et al. | |
| 2011/0301723 A1 | 12/2011 | Pekar et al. | |
| 2012/0290865 A1* | 11/2012 | Kansal | G06F 1/3203 |
| | | | 713/340 |
| 2014/0047252 A1 | 2/2014 | Ansari et al. | |
| 2017/0093962 A1* | 3/2017 | Player | H04L 41/20 |

OTHER PUBLICATIONS

Notification of Transmittal of the International Search Report and the Written Opinion of The International Searching Authority, or the Declaration in connection with International Patent Application No. PCT/US2016/027073 dated Jul. 19, 2016, 10 pages, publisher International Application Division, Korean Intellectual Property Office, Daejeon, Republic of Korea.

Xiaorui Wang, et al., "Coordinating Power Control and Performance Management for Virtualized Server Clusters," IEEE Transactions on Parallel Distributed Systems, vol. 22, No. 2, Feb. 2011, pp. 245-259 publisher the IEEE Computer Society, Washington, DC.

Honeywell, "Profit Controller Multivariable Control and Optimization Technology," Apr. 2012, 3 pages, publisher Automation & Control Solutions, Phoenix, AZ.

Notification of Transmittal of the International Search Report and the Written Opinion of The International Searching Authority, or the Declaration in connection with International Patent Application No. PCT/US2016/027201 dated Jul. 20, 2016, 12 pages, publisher International Application Division, Korean Intellectual Property Office, Daejeon, Republic of Korea.

Qiang Wu, "Making Facebook's Software infrastructure more energy efficient with Autoscale," Aug. 8, 2014, 9 pages, available at https://code.facebook.com/posts/816473015039157 /making-facebook-s-software-infrastructure-more-energy-efficient-with-autoscale.

"Raritan Introduces Intelligent Inline-Meter Rack PDUs to Gather Power Information on Data Center IT Equipment Connected to 'Not-So-Smart' PDUs," Raritan, Oct. 26, 2009, 4 pages, available at http://www.raritan.com/about-us/newsroom/detail/raritan-introduces-intelligent-inline-meter-rack-pdus-to-gather-power-information.

Tridium, "From Insight to Efficiency: Comprehensive Data Center Energy Management Solutions," 2014, 12 pages, publisher Iridium, Inc., Richmond, VA.

Ascent by Alerton, "Building Management Systems; Full Product Line," 2015, 8 pages, publisher Honeywell International Inc., Morristown, NJ.

\* cited by examiner

MULTIVARIABLE CONTROLLER FOR COORDINATED CONTROL OF COMPUTING DEVICES AND BUILDING INFRASTRUCTURE IN DATA CENTERS OR OTHER LOCATIONS

TECHNICAL FIELD

This disclosure relates generally to multivariable control techniques. More specifically, this disclosure relates to a multivariable controller for coordinated control of computing devices and building infrastructure in data centers or other locations.

BACKGROUND

Modern data centers can have a huge number of individual computing servers, with some larger data centers having tens of thousands of computing servers or even more. Due to the large numbers of computing servers in modern data centers, those data centers consume an enormous amount of power. It has been estimated that current data centers are collectively responsible for consuming approximately 3% of the world's electricity, and it is estimated that the consumed power will double in the next five years. The cost of electricity is one of the limiting factors in the performance and profitability of a data center. Because of this, data center owners often wish to reduce their electricity usage while preserving the performance of their data centers.

SUMMARY

This disclosure relates to a multivariable controller for coordinated control of computing devices and building infrastructure in data centers or other locations.

In a first embodiment, a method includes obtaining first information associated with control of multiple computing devices, where the first information relates to possible changes to processing tasks performed by the computing devices. The method also includes obtaining second information associated with building infrastructure operations performed by one or more building systems of one or more buildings that house the computing devices. The method further includes identifying one or more changes to one or more of the computing devices using the first and second information. In addition, the method includes outputting third information identifying the one or more changes.

In a second embodiment, an apparatus includes at least one processing device configured to obtain first information associated with control of multiple computing devices, where the first information relates to possible changes to processing tasks performed by the computing devices. The at least one processing device is also configured to obtain second information associated with building infrastructure operations performed by one or more building systems of one or more buildings that house the computing devices. The at least one processing device is further configured to identify one or more changes to one or more of the computing devices using the first and second information. In addition, the at least one processing device is configured to output third information identifying the one or more changes.

In a third embodiment, a non-transitory computer readable medium contains computer readable program code that, when executed, causes at least one processing device to obtain first information associated with control of multiple computing devices, where the first information relates to possible changes to processing tasks performed by the computing devices. The medium also contains computer readable program code that, when executed, causes the at least one processing device to obtain second information associated with building infrastructure operations performed by one or more building systems of one or more buildings that house the computing devices. The medium further contains computer readable program code that, when executed, causes the at least one processing device to identify one or more changes to one or more of the computing devices using the first and second information. In addition, the medium contains computer readable program code that, when executed, causes the at least one processing device to output third information identifying the one or more changes.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1A through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1A:
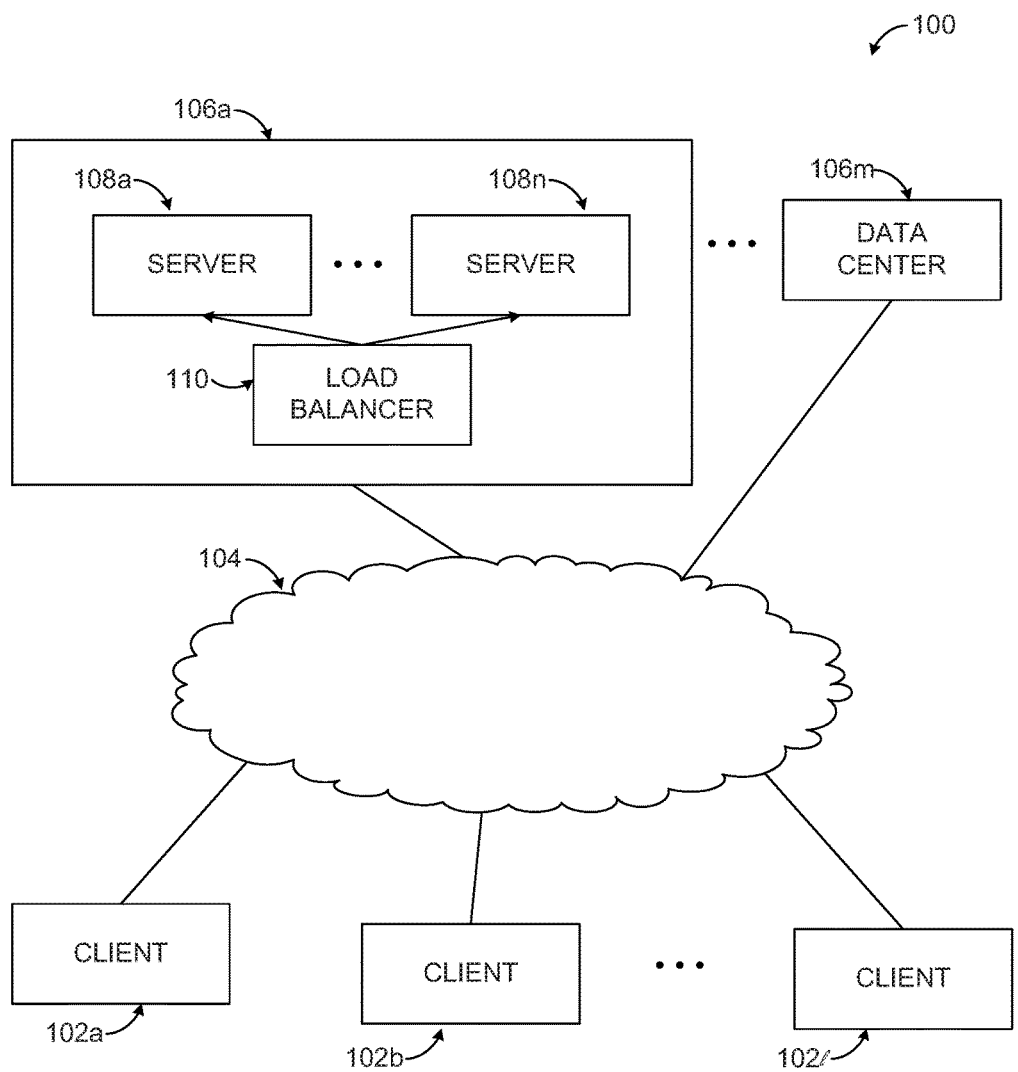
FIGS. 1A and 1B illustrate an example system supporting coordinated control of computing devices and building infrastructure in one or more data centers or other locations according to this disclosure.
Figure 1B:
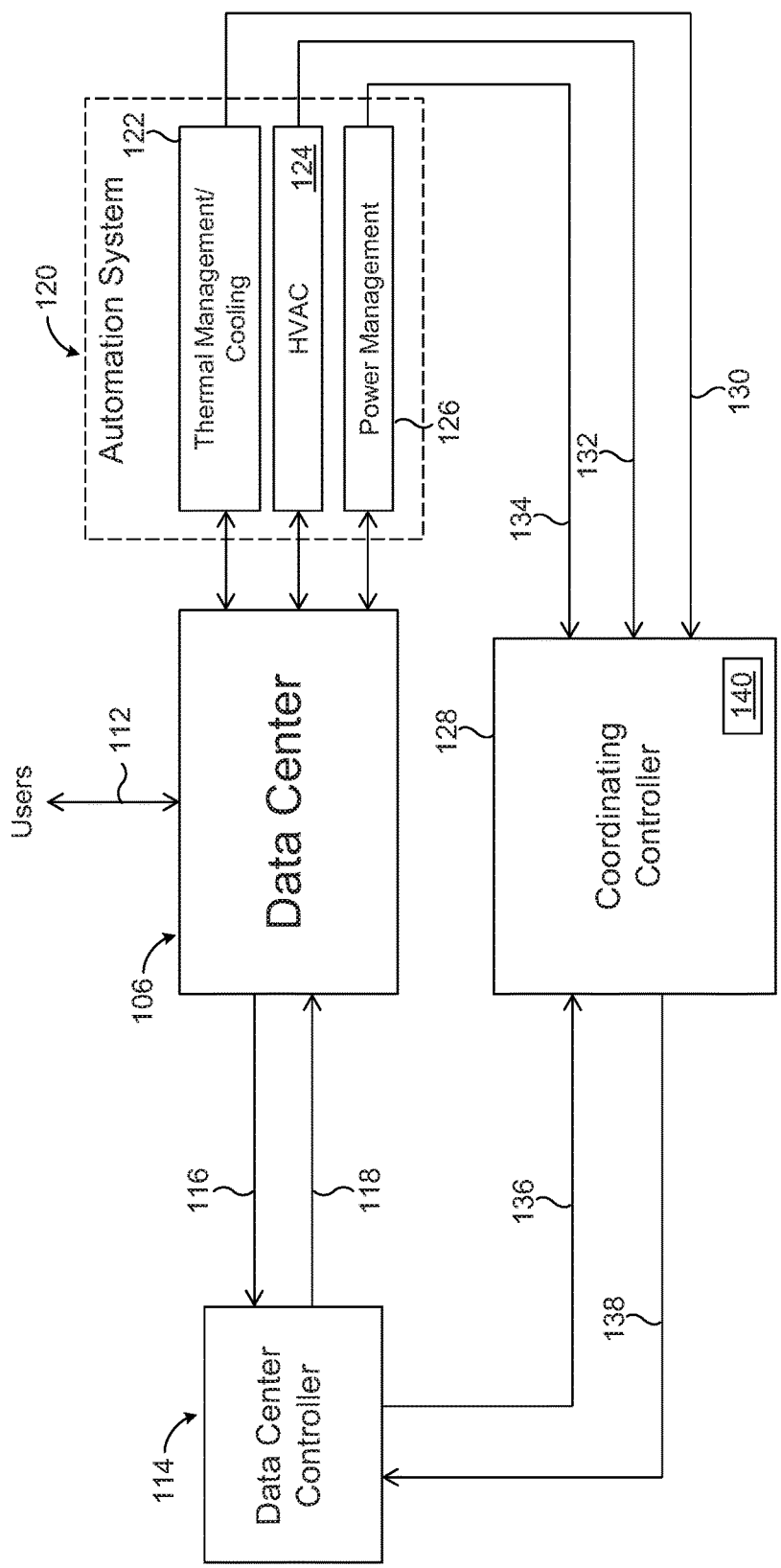

FIGS. 1A and 1B illustrate an example system 100 supporting coordinated control of computing devices and building infrastructure in one or more data centers or other locations according to this disclosure. As shown in FIG. 1A, the system 100 includes multiple clients 102a-102l. The clients 102a-102l represent computing devices or systems used by customers wishing to obtain computing services from one or more data centers. Each of the clients 102a-102l represents any suitable computing device(s) or system(s) at one or more locations.

The clients 102a-102l are configured to communicate over at least one network 104. The network 104 facilitates communication between various components in the system 100. For example, the network 104 may transport Internet Protocol (IP) packets, frame relay frames, Asynchronous Transfer Mode (ATM) cells, or other information between network addresses. The network 104 may include one or more local area networks (LANs), metropolitan area networks (MANs), wide area networks (WANs), all or a portion of a global network such as the Internet, or any other communication system or systems at one or more locations.

One or more data centers 106a-106m are configured to provide computing services to the clients 102a-102l. Each data center 106a-106m could be configured to provide any suitable computing service(s) to its customers. For example, each data center 106a-106m could be used to provide "cloud computing" services or other remote computing services to customers.

In the example shown in FIG. 1A, each data center 106a-106m includes multiple servers 108a-108n and one or more optional load balancers 110. The servers 108a-108n generally denote computing devices that perform specified functions in a data center 106a-106m. Often times, different servers 108a-108n are used to perform different types of functions in a data center 106a-106m. For example, some servers 108a-108n could denote web servers or other servers used to support interactions with the clients 102a-102l via the network 104. Other servers 108a-108n could denote application servers or other servers used to execute virtual machines, applications, or other instructions that provide services to the clients 102a-102l. Still other servers 108a-108n could denote database servers or other servers that manage data used in the data center 106a-106m. Any other or additional types of servers could be used in the data center 106a-106m. Each server 108a-108n includes any suitable structure for performing one or more processing functions.

Often times, each server 108a-108n in a data center 106a-106m could operate in one of multiple states corresponding to one or multiple modes. Any suitable number of modes could be used, where different modes denote different levels of operational readiness and have different power consumptions and different thermal loads. As one particular example, a server could support four modes, such as off, two standby/sleep modes, and one active mode. As another particular example, a server could support six modes, such as off, a standby mode, and four performance modes. As yet another particular example, a server could support seven modes, such as off, two standby modes, and four performance modes. However, any other or additional modes could be used, and different servers 108a-108n in the same data center 106a-106m or in different data centers 106a-106m could use different modes.

In some embodiments, the servers 108a-108n within a data center could be arranged as follows. Multiple servers can be placed within a single rack, and multiple racks can form a single zone. Multiple zones can form a single room, and one or more rooms could form a data center. Of course, other arrangements of the servers 108a-108n within a data center could be used.

Each load balancer 110 helps to distribute computing workloads amongst the various servers 108a-108n in a data center 106a-106m. For example, when a data center 106a-106m includes multiple servers 108a-108n that receive and process requests from the clients 102a-102l, the load balancer 110 can help to distribute those requests in a suitable manner (such as a round robin or modified round robin approach). Each load balancer 110 includes any suitable structure for distributing workloads across multiple computing devices.

Note that the data centers 106a-106m need not have the same configuration. Different data centers 106a-106m could have different arrangements of servers, load balancers, and other components according to particular needs. Also, a single entity could be associated with a single data center 106a-106m or multiple data centers 106a-106m, and the system 100 could include data centers associated with any number of entities.

As shown in FIG. 1B, at least one of the data centers 106a-106m (which could individually be referred to as a data center 106) can interact with various users, such as users of the clients 102a-102l. Data 112 flows between the data center 106 and the users, such as requests related to computing services and the workload data associated with those services.

At least one data center 106 can include or be associated with at least one data center controller 114. A data center controller 114 functions to control the operations of the various servers 108a-108n in the associated data center(s) 106. For example, a data center controller 114 could receive data center information 116 from at least one data center 106, where the information 116 relates to the servers 108a-108n in the associated data center(s) 106. Any suitable information 116 could be received by the data center controller 114. For instance, the information 116 could identify the current operating modes of the servers 108a-108n in the associated data center(s) 106 and the physical and virtual computing loads currently placed on the servers 108a-108n in the associated data center(s) 106.

The data center controller 114 can perform various calculations to generate control information 118 for the associated data center(s) 106. The control information 118 can be used to control one or more aspects of the servers 108a-108n in the associated data center(s) 106. For example, the control information 118 could identify the desired operating modes of the servers 108a-108n in the associated data center(s) 106 and how the computing loads should be distributed on the servers 108a-108n in the associated data center(s) 106. In some embodiments, the data center controller 114 could use one or more models to generate the control information 118 based on the data center information 116, such as one or more models associating server computing capacities with server power usages for different makes and models of servers.

Each data center controller 114 could be implemented in any suitable manner. For example, a data center controller 114 could be implemented as part of a single data center and used to control that data center, and different data center controllers 114 could be used to control different data centers. A data center controller 114 could also be used to control multiple data centers and could reside within or outside of those data centers. Each data center controller 114 includes any suitable structure for controlling the operations of servers and other devices in at least one data center. Each data center controller 114 could, for instance, be implemented using one or more servers or other computing devices. In some embodiments, one or more data center controllers 114 could implement TSO LOGIC PLATFORM data center control technology available from TSO LOGIC. In other embodiments, one or more data center controllers 114 could implement a multivariable control approach, such as an approach described in U.S. patent application Ser. No. 14/869,689 filed on Sep. 29, 2015 and entitled "MULTI-VARIABLE CONTROL FOR POWER-LATENCY MANAGEMENT TO SUPPORT OPTIMIZATION OF DATA CENTERS OR OTHER SYSTEMS" (which is hereby incorporated by reference in its entirety).

Each data center 106 can also include or be associated with at least one automation system 120. The automation systems 120 function to control the operations of various systems in one or more buildings that house the servers 108a-108n of the associated data center(s) 106. For example, one or more thermal management or cooling systems 122 could be used to provide cooling to individual servers or groups of servers 108a-108n in the associated data center(s) 106. Different thermal management or cooling systems 122 could be used to cool different servers or groups of servers. As a result, the thermal loads placed on those thermal management or cooling systems 122 can vary as the different servers or groups of servers produce different amounts of heat. Each thermal management or cooling system 122 denotes any suitable structure configured to cool one or more computing devices.

At least one heating, ventilation, and air conditioning (HVAC) system 124 could be used to provide heating, ventilation, or air conditioning to different areas or sections of a data center 106. For example, depending on the implementation, each HVAC system 124 could be responsible for providing heating, ventilation, or air conditioning to a room, a zone, or a rack of computing devices in the data center 106. In some embodiments, the thermal management or cooling systems 122 could remove thermal energy from the servers 108a-108n in the data center 106 into the surrounding areas of the data center 106, and the HVAC systems 124 could remove the thermal energy from those areas of the data center 106. Since different HVAC systems 124 can be used with different groups of servers, the thermal loads placed on those HVAC systems 124 can vary when the different groups of servers produce different amounts of heat. Each HVAC system 124 denotes any suitable structure configured to provide heating, air conditioning, or ventilation to one or more areas.

In some embodiments, the thermal management or cooling systems 122 and an HVAC system 124 can operate as follows. One or more chillers can be used to remove heat from hot air, and one or more humidifiers can optionally be used to adjust the humidity of the air. A heat exchange network passes the hot air through the chillers and humidifiers and then returns cool humid air to the rooms hosting the servers 108a-108n of a data center 106. Air handlers collect the hot air from the rooms and dispense the cool air into the rooms. The cool air is typically sent to a space below the floor that supports zones of servers. The cool air can be dispensed to an aisle between two zones, and one or more fans of each server can draw cool air into the server and discharge hot air into an aisle on the opposite side of the cool air aisle. The hot air is drawn out of the room (such as through the roof) and returned to the chillers and humidifiers. The cool air flow rate along each aisle can be managed in various ways, such as by using floor tiles with specified (and possibly different) porosity or by using floor tiles with variable speed fans. Note that this is only one example of how a cooling circuit can be configured and that other implementations could also be used. For instance, cool air may also be distributed by large variable-speed fans above the floor level.

At least one power management system 126 could be used to ensure that different areas or sections of a data center 106 receive adequate electrical power. For example, each power management system 126 could ensure that adequate (but not excessive) electrical power is provided to each computing device, rack, zone, or room of the data center 106. Because different servers or groups of servers can operate in different modes, the power provided to each computing device, rack, zone, or room of the data center 106 may vary. Each power management system 126 denotes any suitable structure configured to monitor or control power delivered to one or more computing devices.

In some embodiments, the automation systems 120 could be implemented using data center management technology available from TRIDIUM INC. For example, each HVAC system 124 could be implemented using the ALERTON technology available from TRIDIUM INC.

As noted above, the cost of electricity is one of the limiting factors in the performance and profitability of a data center. Because of this, data center owners often wish to reduce their electricity usage while preserving the performance of their data centers. A data center controller 114 can help to reduce electricity usage of a data center 106 by controlling the modes of the various servers 108a-108n in the data center 106. For example, a data center controller 114 could place various servers into a standby mode to reduce their electrical usage while the other servers remain available to provide computing services to customers. An automation system 120 can also help to reduce electricity usage of a data center 106 by more effectively controlling the removal of thermal energy from the data center 106, thereby reducing electricity usage from cooling operations.

Conventional data centers separate the control of information technology or "IT" aspects of the data centers (such as when and on which servers users' jobs are executed) from facilities management (such as HVAC). However, the time-varying IT load of a data center 106 typically drives the majority of the cooling demand for that data center 106. As a result, keeping the IT and facilities systems separate can lead to inefficiencies in the data center's power usage.

In accordance with this disclosure, at least one coordinating controller 128 is provided to function as a supervisory control layer and leverage information from the systems 122-126 for the data center controller 114. Ideally, this allows the data center controller 114 to more effectively control the servers 108a-108n in the data center(s) 106 so that resources of the data center(s) 106 are used more effectively. A single coordinating controller 128 could be implemented as part of a single data center and used with that data center, and multiple coordinating controllers 128 could be used with different data centers. A coordinating controller 128 could also be used to control multiple data centers and could reside within or outside of those data centers.

Each coordinating controller 128 implements a multivariable control technique to determine how to adjust the operation of one or more data center controllers 114. For example, a coordinating controller 128 could use information from the systems 122-126 in order to instruct the data center controller(s) 114 how the modes of various servers 108a-108n could be modified. Ideally, the coordinating controller 128 can make these adjustments while attempting to reduce or minimize power consumption of the systems 122-126 and at the same time helping to ensure that adequate computing resources are available to satisfy customer demand.

Each coordinating controller 128 includes any suitable structure supporting multivariable control, such as a server or other computing device. Each coordinating controller 128 also supports any suitable multivariable control technology. In some embodiments, each coordinating controller 128 can be implemented using a Robust Multivariable Predictive Control Technology (RMPCT) controller or other type of controller implementing model predictive control or other advanced process control. As a particular example, each coordinating controller 128 could implement a PROFIT CONTROLLER or PROFIT OPTIMIZER from HONEYWELL INTERNATIONAL INC. Other example components that could be incorporated include a PROFIT SEN- SORPRO, PROFIT STEPPER, PROFIT EXPERT, or CONTROL PERFORMANCE MONITOR from HONEYWELL INTERNATIONAL INC.

As an example of the multivariable control functionality, model predictive control (MPC) is a well-known control technique in industrial settings. MPC uses one or more models to predict how one or more controlled variables (CVs) in an industrial process will act in the future in response to changes to one or more manipulated variables (MVs) and/or one or more disturbance variables (DVs). A controlled variable denotes a variable whose value is controlled to be at or near a setpoint or within a desired range or optimized in some sense (typically maximized or minimized). A manipulated variable denotes a variable that is adjusted in order to alter the value of at least one controlled variable. A disturbance variable denotes a variable whose value can be considered when determining how to adjust one or more manipulated variables to achieve a desired change in one or more controlled variables, but the disturbance variable itself cannot be controlled or adjusted.

It is often the case that (i) a single manipulated variable or disturbance variable affects multiple controlled variables and (ii) multiple manipulated variables could be changed to alter a controlled variable in a desired manner. Thus, MPC control is often cast as a multivariable problem in which a controller attempts to determine how to adjust multiple manipulated variables in order to keep one or more controlled variables at their setpoints or within their acceptable limits. Often times, this takes the form of an economic optimization problem in which the controller attempts to determine how to adjust the manipulated variables while satisfying some specified goal or goals, such as maximizing an industrial plant's profit or minimizing the usage of raw materials by the industrial plant.

Each coordinating controller 128 could execute one or more MPC or other advanced control techniques that are customized for a data center setting. For example, a coordinating controller 128 could receive information 130 from one or more thermal management or cooling systems 122, such as information identifying the thermal load placed on each thermal management or cooling system 122. A coordinating controller 128 could also receive information 132 from one or more HVAC systems 124, such as information identifying the HVAC load per area or section (such as room, zone, or rack) of a data center. A coordinating controller 128 could further receive information 134 from one or more power management systems 126, such as information identifying the power load per device, rack, zone, or room. In addition, a coordinating controller 128 could receive information 136 from one or more data center controllers 114, where the information 136 is related to possible changes that could be made to servers by the data center controllers 114 and limitations placed on those changes. For instance, the information 136 could include information identifying which servers are available for entering a standby mode, how much computing power is available, and priorities and constraints on where and when processing tasks are to be executed in a data center (or portion thereof).

One example type of constraint could include limiting usage of a particular server or group of servers to a particular customer or department (such as when that customer or department has paid for a particular server or server group). Another example type of constraint could include ensuring that certain data subject to export restrictions (such as from a particular customer) is stored or processed only on specific servers or groups of servers (such as servers that are ITAR-compliant).

Each coordinating controller 128 could execute the one or more MPC or other advanced control techniques in order to generate information 138 for one or more data center controllers 114. The information 138 could include information that is used by the data center controller(s) 114 to adjust the operation of the data center(s) 106. For example, the information 138 could include an identification of which servers 108a-108n should be selected for entering a standby mode. The information 138 could also include an identification of servers 108a-108n (such as by rack, zone, or room) to or from which processing tasks should be moved. The processing tasks can be identified in any suitable manner, such as by identifying the virtual machines or applications to be moved to or from a rack, zone, or room. The data center controller(s) 114 could then use this information to more effectively control which servers 108a-108n are active and which servers 108a-108n are in standby. The data center controller(s) 114 could also use this information to more effectively control which servers 108a-108n are executing various virtual machines or other processing tasks.

One or more models 140 can be used by a coordinating controller 128 to perform these functions. For example, the model(s) 140 could associate the impacts of processing loads on power consumptions and cooling requirements per rack, zone, or room of equipment. The model(s) 140 could also associate the impact of cooling loads on power consumptions. The model(s) 140 could further identify available computing resources in servers and priorities and constraints on where and when computing workloads may be executed. The coordinating controller 128 can use the model(s) 140 to help identify the output information 138 based on the input information 130-136.

Each model 140 could be generated in any suitable manner. For example, one or more models 140 could be generated using historical data from which it is possible to correlate changes in device loads with power consumptions and cooling requirements or to correlate changes in cooling loads with power consumptions. As another example, testing could be done to measure changes in characteristics such as power consumptions and cooling requirements when operating at different device loads or power consumptions when operating at different cooling loads. This is commonly referred to as "step testing" in that changes to variables often occur in steps in order to view the responses of other variables to those steps.

The output of a coordinating controller 128 could take various forms. For example, a coordinating controller 128 could output specific servers that are to be placed in different modes or specific racks, zones, or rooms to or from which processing loads are to be moved. A coordinating controller 128 could also output a "profile" of servers identifying the numbers of servers that could be placed in different modes or a number of racks, zones, or rooms that could handle current or estimated future processing loads. The profile(s) could be used by the data center controller(s) 114 to control which specific servers are placed in different modes or which specific servers to or from which processing loads are moved.

Note that this type of multivariable control for one or more data centers is well-suited for integration with predictions of customer demand (workload), meaning a coordinating controller 128 can consider predictions of future workloads to be placed on one or more data centers when performing control operations. These predictions of future workloads can be identified in any suitable manner. For example, predictions can be created via knowledge of a data center and its scheduled activities. Predictions can also be created using data-driven techniques in which the workload in a data center is monitored over long periods of time and its patterns (such as daily, weekly, or event driven) are learned and incorporated into a real-time prediction of workload. As particular examples, a state estimated feedforward method and/or a forecasted feedforward method could be used. The state estimated feedforward method involves monitoring changes in current demand being handled by servers and projecting forward an estimated trend of increasing or decreasing demand, and then comparing the trend to actual demand using feedback and adjusting the projections as necessary. The forecasted feedforward method involves utilizing past demand placed on servers as a function of time and forecasting forward in time the expected increase or decrease in demand, and then comparing the forecasted demand to actual demand using feedback and adjusting the projections as necessary. The coordinating controller 128 can take the estimated workload as an input and use it internally, such as to determine a future prediction of a disturbance variable.

In this way, a closed loop can be formed between cooling and power systems (systems 122-126) and data center controllers 114, which enables more optimal control operations by the data center controllers 114. For example, this enables the data center controllers 114 to make decisions about which servers 108a-108n should be active or in standby in order to decrease or minimize energy usage by the systems 122-126 that are powering and cooling the servers 108a-108n. Additional details regarding operations of the coordinating controller 128 are provided below.

Although FIGS. 1A and 1B illustrate one example of a system 100 supporting coordinated control of computing devices and building infrastructure in one or more data centers or other locations, various changes may be made to FIGS. 1A and 1B. For example, the system 100 could include any number of clients, networks, data centers, servers, load balancers, data center controllers, and coordinating controllers. Also, the functional divisions shown in FIGS. 1A and 1B are for illustration only. Various components in FIGS. 1A and 1B could be omitted, combined, or further subdivided and additional components could be added according to particular needs. As a particular example, a coordinating controller 128 could be integrated into a data center controller 114 or into a component or components of a data center. Further, computing systems come in a wide variety of configurations, and FIGS. 1A and 1B do not limit this disclosure to any particular configuration of computing system. In addition, while often described in this patent document as being used to control servers in one or more data centers, one or more coordinating controllers 128 could be used to help optimize operations of any suitable computing devices in any suitable system(s).

Figure 2:
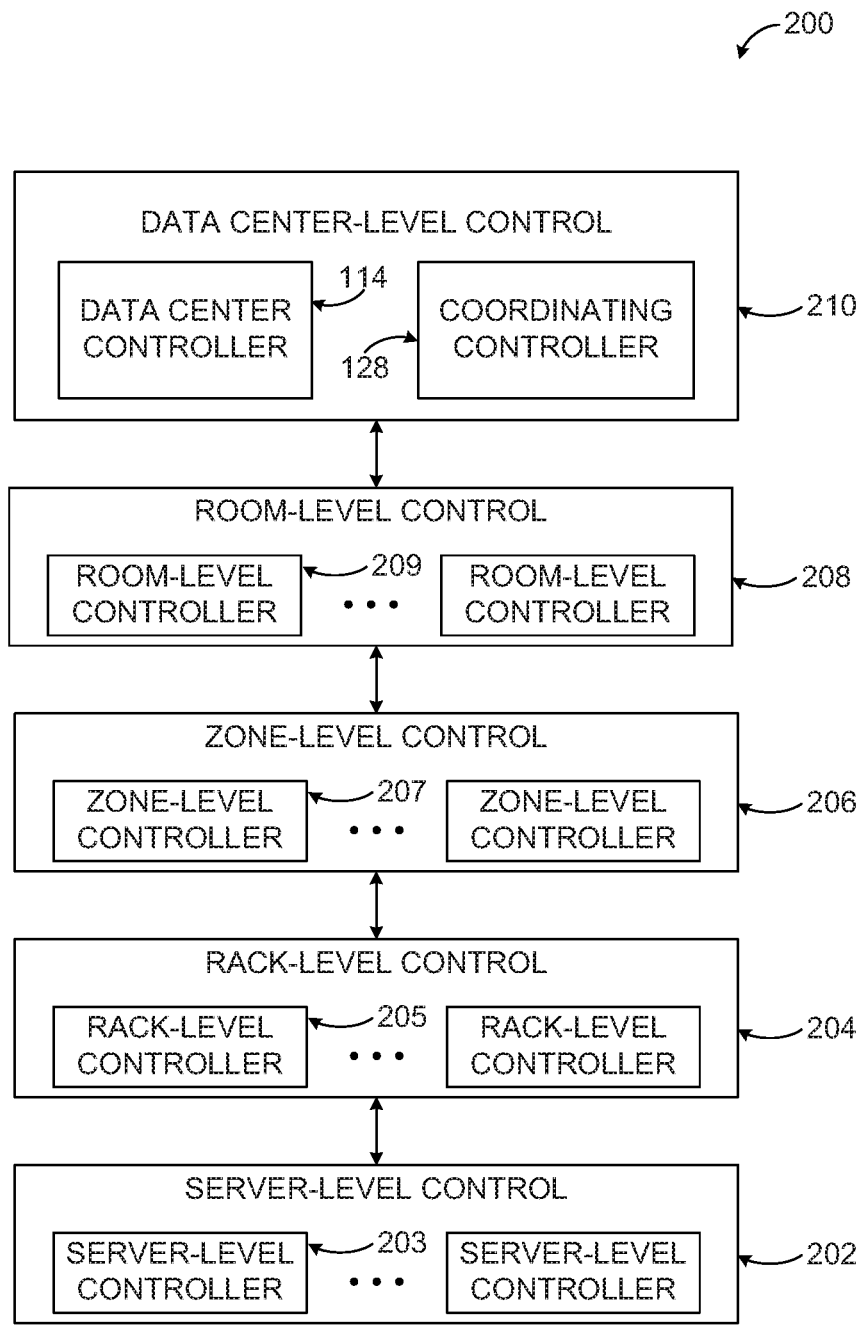
FIG. 2 illustrates an example controller hierarchy for one or more data centers or other locations according to this disclosure.

FIG. 2 illustrates an example controller hierarchy 200 for one or more data centers or other locations according to this disclosure. It is possible (although not required) that the data center controller(s) 114 and the coordinating controller(s) 128 described above could form part of a larger hierarchical arrangement of controllers associated with at least one data center. The controller hierarchy 200 in FIG. 2 represents one example of such a hierarchical arrangement of controllers. For ease of explanation, the controller hierarchy 200 of FIG. 2 is described with respect to the data centers 106, 106a-106m and servers 108a-108n of FIGS. 1A and 1B. However, the controller hierarchy 200 could be used with any other suitable system.

As shown in FIG. 2, the controller hierarchy 200 includes a server-level control layer 202, which could include a server-level controller 203 for each server 108a-108n in one or more data centers. Each server-level controller 203 determines the appropriate power state needed to process the computing demand for an associated server. In some embodiments, server-level controllers 203 may have a small execution interval for control operations, such as in the millisecond range. One responsibility of each server-level controller 203 can be to ensure that user demand allocated to a server is executed with reduced or minimum overall power usage. This could include each server-level controller 203 allocating processing loads to various processor cores of a server in order to meet the server's assigned demand with minimum power usage. This could also include each server-level controller 203 holding a server at its assigned power setting target (if provided) and transitioning the server between different modes.

The demand allocated to each server could be determined by a rack-level control layer 204, which includes rack-level controllers 205. Each rack-level controller 205 can determine the optimal demand allocation to the servers within a rack. In some embodiments, rack-level controllers 205 may have a longer execution interval for control operations, such as in a range of several seconds. One responsibility of each rack-level controller 205 can be to ensure that the demand allocated to a rack is executed with reduced or minimal overall power usage by the servers in the rack. At this level, minimum overall power usage could include the power used by the servers in a rack and the power required to remove heat generated by the servers in the rack.

Example factors considered by each rack-level controller 205 when allocating load could include the clock speed of the servers in a rack and the thermal gradient of the rack. Higher processor clock speeds result in higher power consumption and more heat, so it may not be optimal to push the processors of each server as hard as possible. Also, the thermal gradient refers to the fact that the inlet air temperature of the rack's servers may not be constant, such as when the inlet air is colder at the bottom of a rack and gets warmer for each successively-higher server in the rack. It may therefore be more power efficient to run the servers at the bottom of a rack harder than the servers at the top of a rack. With identical processor loadings, the cooling fans of the topmost servers may have to run faster than the cooling fans of the bottommost servers to maintain cooling of the servers. The rack-level controllers 205 can therefore take into account thermal efficiencies as well as computing loads. Each rack-level controller 205 could also determine the operating modes of the servers in a rack, and thermal issues could again be accounted for in this determination.

A zone-level control layer 206 could include a zone-level controller 207 for each zone of racks, where each zone-level controller 207 can determine an optimal demand allocation for each rack in a zone. Like rack-level controllers 205, the zone-level controllers 207 can account for both computing demand and thermal gradient conditions. In some embodiments, zone-level controllers 207 may have an even longer execution interval for control operations, such as in a range of several minutes. One responsibility of each zone-level controller 207 can be to ensure that the computing demand allocated to a zone is executed with reduced or minimal overall power usage by the racks in the zone. At this level, minimum overall power usage could include the power used by the racks and the power required to remove heat generated by the servers in the racks.

For zone-level controllers 207, accounting for thermal gradients may be more complex since the thermal gradients can be two-dimensional. For example, the vertical gradients at different racks (described above) are coupled with horizontal gradients across the racks of the zone. As a particular example, the racks at the ends of a zone could be cooler that the racks within the interior of the zone (given the same demand) since there is less heat transfer between adjacent racks at the ends of the zone. Thus, for the same demand, the racks at the ends of a zone may require slower overall fan speeds to achieve the same cooling effect as those racks in the middle of the zone. The overall fan speeds could increase with each successive rack moving from each end of the zone to the middle of the zone.

It may therefore be more power efficient overall to run the racks at the ends of the zone harder than the racks in the middle of the zone. Since the thermal map across a zone can be two-dimensional, the overall most power efficient mode of operation could be to first load up the servers starting from the bottom servers of racks at the ends of the zone and add more bottom servers of racks successively moving toward the middle of the zone (with reduced loads when moving toward the middle of the zone). Once all bottom servers are loaded as desired, the servers immediately above the bottom servers in each rack could be loaded, starting from the ends of the zone and moving successively toward the middle (again with reduced loads when moving toward the middle of the zone). This could continue until the demand allocated to the zone is satisfied. Each zone-level controller 207 could also determine the operating modes of the servers in a zone, and thermal issues could again be accounted for in this determination.

A room-level control layer 208 could include a room-level controller 209 for each room of zones, where each room-level controller 209 can determine an optimal demand allocation to each zone within a room and one or more optimal targets for a cooling system. Like rack-level controllers 205 and zone-level controllers 207, the room-level controllers 209 can account for both demand and thermal gradient conditions. In some embodiments, room-level controllers 209 may have an even longer execution interval for control operations, such as in a range of minutes to tens of minutes. One responsibility of each room-level controller 209 can be to ensure that the demand allocated to a room is executed with reduced or minimal overall power usage by the zones in the room. At this level, minimum overall power usage could include the power used by the zones, the power required to remove heat generated by the racks, and the power to operate at least one cooling system for the room.

For room-level controllers, accounting for thermal gradients becomes three-dimensional. The vertical gradients seen at the racks and the horizontal gradients across the zones (both described above) are coupled with a spatial gradient within a room. The spatial gradient issue is similar to the horizontal gradient issue in that zones at the boundaries of a room may be cooler compared to zones within a room (given the same demand). Thus, for the same demand, the zones at the boundaries of a room may require slower overall fan speeds to achieve the same cooling effect compared to zones in the middle of the room. The overall fan speeds could increase with each successive zone moving from the room boundary towards the center of the room.

As is the case for each zone, it may be more power efficient overall to run the zones at the boundaries of a room harder than those in the center of the room. Since the thermal map across the room is three-dimensional, the overall most power efficient mode of operation may be to first load up the servers starting from the bottom servers of zones at the boundary of the room and add more bottom servers of zones successively moving toward the center of the room (with reduced loads when moving toward the middle of the room). Once all bottom servers are loaded as desired, the servers immediately above the bottom servers in each zone could be loaded starting from the boundary of the room and moving successively toward the center of the room (again with reduced loads when moving toward the middle of the room). This could continue until the demand allocated to the room is satisfied. Each room-level controller 209 could also determine the operating modes of the servers in a room, and thermal issues could again be accounted for in this determination.

In some embodiments, each room of a data center could have its own cooling system. Therefore, room-level controllers 209 could incorporate power utilization of an associated cooling system's operations into its control solution. In particular embodiments, a cooling system could add at least three additional variables that can be used by a room-level controller 209 to determine optimal power usage. These variables could include the temperature of cool air returned from a chiller, the humidity of the cool air returned from the chiller, and an air flow rate of the cool air returning from the chiller to the room. Note that the air flow rate may not directly be controllable and could be controlled by altering the pressure of the air beneath the floor. These three variables of a cooling system are often associated with different amounts of power usage. The largest power user could be the chiller (unless, for example, cold water from a natural source is available). The next highest power user is typically an air handler system that controls the air flow rate. The smallest power user is typically the humidifier. The biggest impact on the chiller's power usage may be the cool air return temperature (the temperature of cool air provided to a room). The larger the temperature difference between the hot air received from a room and the cool air returned to the room, the more power usage is required by the chiller. Since the temperature of the hot air received from the room is not typically controllable, the main variable could be the temperature of the cool air returned.

In some embodiments, each room could have multiple air handlers, such as air handlers distributed around the boundary of the room. The air handlers operate to remove hot air from the room (such as through the roof), circulate the air through a chiller, and return cooled air to the room (such as under the floor of the room). The cooled air makes its way up into the room (such as through porous tiles in the floor) between two zones. The air flow rate profile across the aisle between the zones could be controlled by, for example, placing tiles with different porosity across the aisle. The larger the porosity of the tile, the faster the air flow rate in that section of the aisle. The overall air flow rate from the handlers can be controlled by the pressure of the air underneath the floor. A determination of how to place the tiles of differing porosity is typically done manually based on demand across the two zones. Some data centers are beginning to deploying floor tiles with variable speed fans that allow dynamic allocation of the air rate across the aisle. That setup enhances the ability to more effectively distribute air across an aisle and leads to reduced power usage for the room. Since the power to operate the air handlers is less than that of the chiller, it may make sense to run the air handlers as hard as possible before lowering the cool air return temperature.

Each air handler could have a humidifier that adds water droplets to the air in order to maintain an acceptable humidity of the air. The humidity of the air often needs to be within two operating extremes. For example, the humidity often has to be high enough to prevent static discharge common with air that is too dry, and the humidity often has to be low enough to prevent condensation from occurring. Within these two extremes, the amount of water in the air can vary. The water in the air can have both positive and negative effects on the cost of operation for a data center. For instance, a positive effect can be that wetter air is more efficient in absorbing heat from the servers. This might reduce the power required by a chiller since the cool air returned from the chiller can be warmer and still effectively remove heat from the room. Also, since wetter air is a better heat sink, it reduces the power required by the air handlers since less air circulation may be required given a specific demand. The power used by the fans on the servers could also be reduced since they may not have to operate as hard to remove the same amount of heat from the servers. A negative effect is that wetter air is more corrosive. If air is too wet (even though it is not condensing), oxidation of server components, server supporting infrastructures, and ducts used to transport circulated air may occur. This may limit the life of the equipment and result in increased lifecycle costs associated with replacing the equipment. Given that wetter air has both positive and negative effects, finding the optimal humidity of the air can be weighed against the increase life cycle cost.

In order to effectively utilize the three additional variables (three degrees of freedom) provided from a cooling system, the cooling system could be automated to some degree in order to receive targets from a room-level controller 209 and operate based on those targets. If a cooling system cannot or is not automated, the room-level controller 209 could produce suggested operating values and rely on human intervention to apply them.

A data center-level control layer 210 could include the data center controller(s) 114 and the coordinating controller(s) 128. The data center controllers 114 can determine an optimal demand allocation to each room of zones within a data center. In some embodiments, data center controllers 114 may have an even longer execution interval for control operations, such as in a range of tens of minutes to an hour or more. One responsibility of the data center controllers 114 and the coordinating controllers 128 can be to allocate the demand to each respective room so as to minimize overall power usage by the rooms. At this level, minimum overall power usage could include monitoring the power efficiency of each room and changing demand allocation to favor more efficient rooms.

As described above, the coordinating controllers 128 can be used to help inform the data center controllers 114 of how data center operations can be performed to minimize power usage based on input from the systems 122-126. Changing the demand allocation to the rooms could be a function of environmental conditions, such as those affecting the efficiency of chillers used by the rooms. One such condition could be the effect of ambient temperature on the chiller efficiency of each room. As the ambient temperature changes throughout the day, the efficiency of the chillers for each room may be affected in different amounts. Another such condition may be the effect that the position of the sun has on the efficiencies of the chillers. As the sun rises in the east, radiative heat may be more pronounced on the rooms on the eastern side of a data center, resulting in less efficient chiller operations for those rooms. As the sun moves to the west, the radiative affect transitions to the western side of the data center, resulting in less efficient chiller operations for rooms on the western side. The direction of the wind may also affect the efficiency of the chillers for each room differently.

In addition, weather changes in general (such as sun, rain, or snow) may affect the efficiency of the chillers for each room differently.

The data center controllers 114 and the coordinating controllers 128 could account for these changes in environmental conditions and adjust the load allocated to each room accordingly to ensure minimum overall power usage of the data center. In some embodiments, an "overall power use to hertz ratio" for each room can be monitored. Demand to each room can be adjusted to favor the room with the smallest ratio, then the next-smallest ratio, and so on.

Each controller shown in FIG. 2 could be implemented in any suitable manner. For example, one, some, or all of the controllers in FIG. 2 could denote multivariable controllers implementing MPC or other advanced control techniques. One or more models for each controller could be generated in any suitable manner, such as by using historical data, step testing, hardware manufacturer data, or other information.

Although FIG. 2 illustrates one example of a controller hierarchy 200 for one or more data centers or other locations, various changes may be made to FIG. 2. For example, any of the control layers shown in FIG. 2 could be used individually or in any combination with one or more other control layers. Thus, for instance, the controllers 114 and 128 of the data center-level control layer 210 could be used independently or in any combination with the controllers of the control layers 202, 204, 206, and 208. Also, the functionalities of a data center controller 114 and a coordinating controller 128 could be combined into a single control device or platform, possibly with other controllers shown in FIG. 2.

Figure 3:
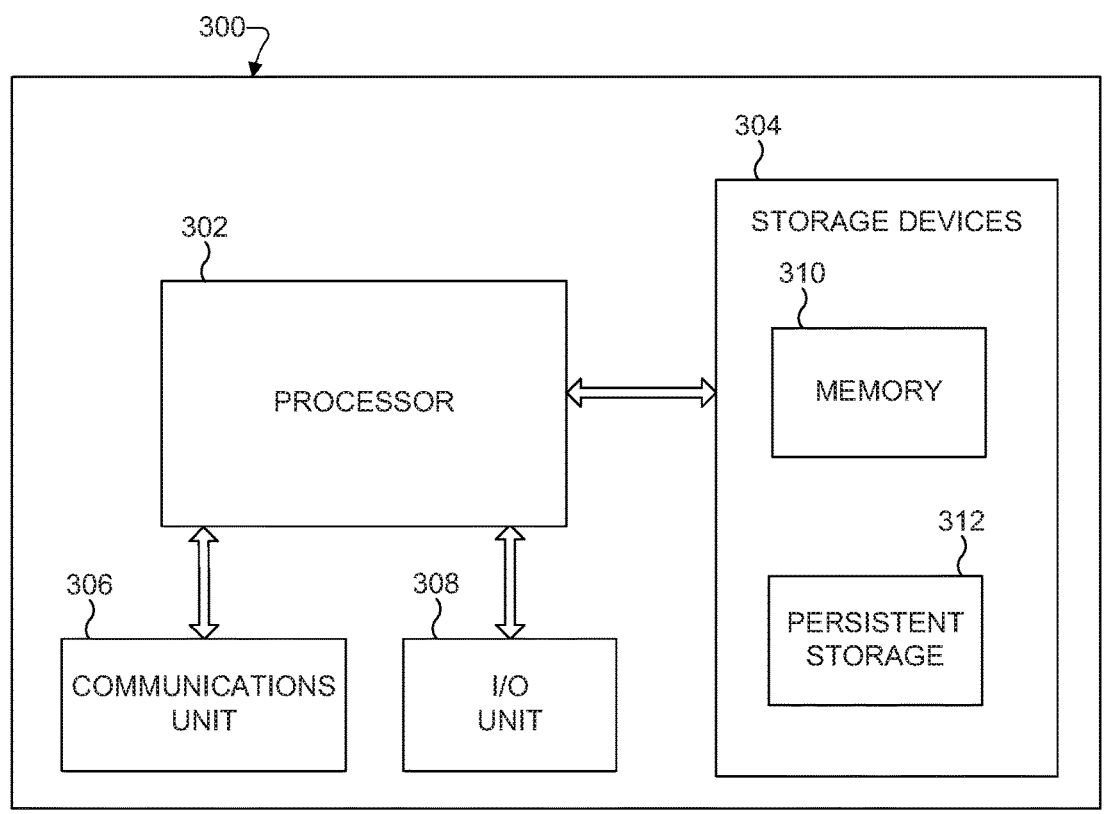
FIG. 3 illustrates an example control device for use with one or more data centers or other systems according to this disclosure.

FIG. 3 illustrates an example control device 300 for use with one or more data centers or other systems according to this disclosure. The device 300 could, for example, represent a coordinating controller 128, a data center controller 114, or any other controller shown in FIGS. 1A, 1B, and 2. However, each controller could be implemented using any other suitable device(s). Also, the device 300 could be used in any suitable system.

As shown in FIG. 3, the device 300 includes at least one processor 302, at least one storage device 304, at least one communications unit 306, and at least one input/output (I/O) unit 308. Each processor 302 can execute instructions, such as those that may be loaded into a memory 310. Each processor 302 denotes any suitable processing device, such as one or more microprocessors, microcontrollers, digital signal processors, application specific integrated circuits (ASICs), field programmable gate arrays (FPGAs), or discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include at least one network interface card or wireless transceiver facilitating communications over at least one wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

The device 300 could execute instructions used to perform any of the functions associated with the coordinating controller 128, the data center controller 114, or other controller described above. For example, when used as a coordinating controller 128, the device 300 could execute instructions that receive information 136 about the operation of servers in at least one data center and information 130-134 about building infrastructure operations (such as thermal management or cooling, HVAC, and power management operations). The device 300 could also execute instructions that use one or more models 140 to identify changes to the data center servers that could reduce or minimize power usage in view of the received information. The device 300 could further execute instructions that allow the device 300 to output information 138 to a data center controller 114 in order to adjust the operation of one or more servers in the data center.

When used as a data center controller 114, the device 300 could execute instructions that provide information 136 about the operation of servers in at least one data center to a coordinating controller 128. The device 300 could also execute instructions that use information 138 received from the coordinating controller 128 to make adjustments to the operation of one or more servers in the data center.

Although FIG. 3 illustrates one example of a control device 300 for use with one or more data centers or other systems, various changes may be made to FIG. 3. For example, various components in FIG. 3 could be combined, further subdivided, or omitted and additional components could be added according to particular needs. Also, computing devices can come in a wide variety of configurations, and FIG. 3 does not limit this disclosure to any particular configuration of computing device.

Figure 4:
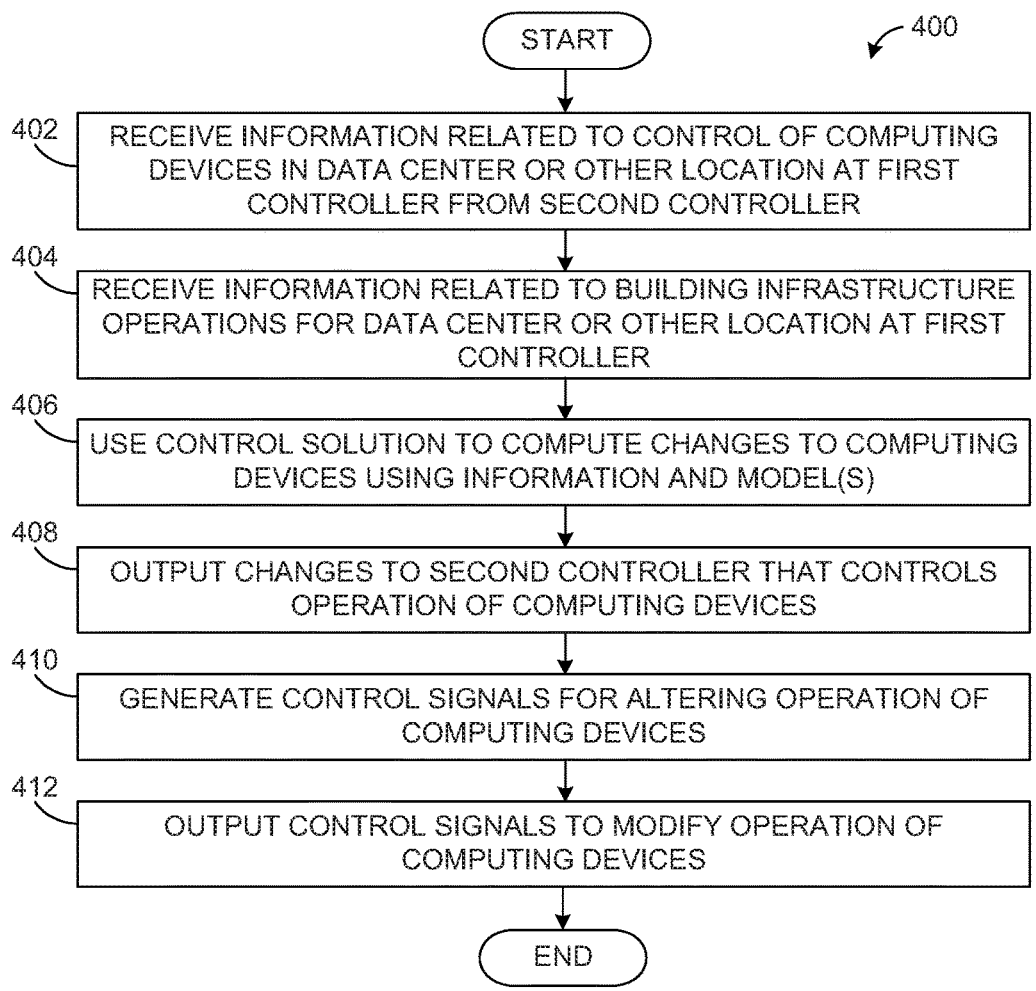
FIG. 4 illustrates an example method for providing multivariable coordinated control of computing devices and building facilities in one or more data centers or other locations according to this disclosure.

FIG. 4 illustrates an example method 400 for providing multivariable coordinated control of computing devices and building facilities in one or more data centers or other locations according to this disclosure. For ease of explanation, the method 400 is described with respect to the coordinating controller 128 and the data center controller 114 each implemented as shown in FIG. 3 and operating in the system 100 shown in FIGS. 1A and 1B. However, the method 400 could be performed using any other suitable device(s) and in any suitable system.

As shown in FIG. 4, information related to control of computing devices in a data center or other location is received by a first controller from a second controller at step 402. This could include, for example, the processor 302 of the coordinating controller 128 receiving various information 136 from the data center controller 114. As noted above, the received information 136 could identify which servers 108a-108n in a data center are available for entering a standby mode, how much computing power is available in a data center, and priorities and constraints on where and when processing tasks are to be executed in a data center (or portion thereof).

Information related to building infrastructure operations for the data center or other location is received by the first controller at step 404. This could include, for example, the processor 302 of the coordinating controller 128 receiving various information 130-134 from one or more thermal management or cooling systems 122, HVAC systems 124, and power management systems 126. As noted above, the received information 130-134 could identify the thermal load being placed on each thermal management or cooling system 122, the HVAC load per area or section (such as room, zone, or rack) of a data center, and the power load per device, rack, zone, or room.

A control solution is used by the first controller to identify changes to one or more computing devices at step 406. This could include, for example, the processor 302 of the coordinating controller 128 using one or more models 140, such as one or more models that associate processing loads with power consumptions and cooling requirements (such as per rack, zone, or room of equipment) and that associate cooling loads with power consumptions. One or more models 140 could also identify available computing resources in servers and priorities and constraints on where and when computing workloads (such as virtual machines) may be executed. The model(s) 140 can be used to identify which servers 108a-108n should be selected for entering different modes (such as one or more standby modes). The model(s) 140 can also be used to identify the servers 108a-108n (such as by rack, zone, or room) to or from which computing workloads should be moved. The control solution can be generated while taking into account some form of economic optimization, such as by solving the control solution while minimizing energy consumption. Other or additional goals that could be used in an economic optimization could include moving processing loads away from servers that are near, at, or over some constraint or balancing processing loads among a group of servers. As noted above, one or more constraints (such as limiting usage of servers to particular customers or data subject to export restrictions) could also be considered when the control solution is identified.

The identified changes are output to the second controller at step 408. This could include, for example, the processor 302 of the coordinating controller 128 outputting the identified changes to the data center controller 114 in the form of specific changes to be made or one or more profiles. The data center controller 114 controls the operation of the servers 108a-108n and can use the identified changes to modify the operation of the servers 108a-108n. For example, the second controller could generate control signals for altering operation of various computing devices at step 410 and output the control signals to modify the operation of the various computing devices at step 412. This could include, for example, the processor 302 of the data center controller 114 using the information from the coordinating controller 128 to select servers 108a-108n to change operating modes. This could also include the processor 302 of the data center controller 114 using the information from the coordinating controller 128 to select virtual machines or other processing tasks to be moved to or from specified servers 108a-108n.

In this way, the coordinating controller 128 allows building infrastructure operations (like thermal management/cooling, HVAC, and power management operations) to be taken into account by the data center controller 114 when performing control operations. This may allow, for example, balancing of the loads placed on different thermal management or cooling systems 122 or different HVAC systems 124 in a data center so that the systems are not over-taxed or under-taxed. This may also allow the overall system to unite and coordinate control over virtual machines or other processing tasks in a manner that allows more effective reduction of energy usage by building infrastructure components of a data center.

Although FIG. 4 illustrates one example of a method 400 for providing multivariable coordinated control of computing devices and building facilities in one or more data centers or other locations, various changes may be made to FIG. 4. For example, while shown as a series of steps, various steps in FIG. 4 could overlap, occur in parallel, occur in a different order, or occur any number of times. Also, while shown as involving first and second controllers, the functionality of the controllers 114 and 128 could be combined into a single functional unit or platform, in which case the transfers of information shown in FIG. 4 could be omitted or occur internally with the single controller. In addition, while often described as involving a single data center, the operations shown in FIG. 4 could involve any number of data centers.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for controlling operation of computing devices comprising:
    obtaining first information associated with control of multiple computing devices, the first information related to possible changes to processing tasks performed by the computing devices wherein the first information includes one or more of:
        information identifying which computing devices are available to enter a standby mode of operation,
        information identifying how much computing power is available; and
        information identifying priorities and constraints on where and when the processing tasks are to be executed by the computing devices;
    obtaining second information associated with building infrastructure operations performed by one or more building systems of one or more buildings that house the computing devices wherein the second information includes one or more of:
        information identifying thermal loads placed on different thermal management or cooling systems associated with the computing devices,
        information identifying heating, ventilation, and air conditioning (HVAC) loads for different areas of the one or more buildings, and
        information identifying power loads of the computing devices or of different groups of computing devices;
    generating a control solution using economic optimization including one or more steps, the steps comprising:
        solving the control solution while minimizing energy consumption, moving processing loads away from computing devices that are near, at, or over some constraint or balancing processing loads among a group of computing devices, and
        limiting usage of computing devices to particular customers or data subject to export restrictions,
    identifying by the coordinating controller, using the generated control solution, one or more changes to one or more of the computing devices using the first and second information; and
    outputting third information to a second controller identifying the one or more changes for generating control signals for altering operation of various computing devices.

2. The method of claim 1, wherein identifying the one or more changes comprises identifying the one or more changes that at least one of:
    reduce an overall power consumption of the computing devices and the one or more building systems;
    balance processing loads on the computing devices; and
    move processing loads from some of the computing devices to others of the computing devices.

3. The method of claim 1, wherein:
a first controller obtains the first information and the second information and identifies the one or more changes; and
the first controller outputs the information identifying the one or more changes to a second controller that is configured to implement the one or more changes.

4. The method of claim 1, wherein the first information includes the information identifying the priorities and constraints, the information identifying the priorities and constraints comprising:
information indicating that one or more of the computing devices are assigned to a particular customer; and
information indicating that one or more of the computing devices are able to process or store data subject to one or more export restrictions.

5. The method of claim 1, wherein the third information includes one or more of:
information identifying which computing devices should change operating mode; and
information identifying which computing devices to or from which processing loads should be moved.

6. The method of claim 1, wherein a multivariable controller obtains the first information and the second information, identifies the one or more changes, and outputs the information identifying the one or more changes.

7. The method of claim 6, wherein the multivariable controller operates as a supervisory control layer over at least one other controller and uses the second information to partially control the at least one other controller.

8. The method of claim 1, wherein:
the computing devices comprise servers; and
the servers reside within at least one data center.

9. An apparatus comprising:
at least one processing device and storage device configured to:
obtain first information associated with control of multiple computing devices, the first information related to possible changes to processing tasks performed by the computing devices wherein the first information includes one or more of:
information identifying which computing devices are available to enter a standby mode of operation;
information identifying how much computing power is available; and
information identifying priorities and constraints on where and when the processing tasks are to be executed by the computing devices;
obtain second information associated with building infrastructure operations performed by one or more budding systems of one or more buildings that house the computing devices wherein the second information includes one or more of;
information identifying thermal loads placed on different thermal management or cooling systems associated with the computing devices;
information identifying heating, ventilation, and aft conditioning (HVAC) loads for different areas of the one or more buildings; and
information identifying power loads of the computing devices or of different groups of computing devices;
generate a control solution using economic optimization including one or more steps, the steps comprising:
solving the control solution while minimizing energy consumption,
moving processing loads away from computing devices that are near, at, or over some constraint or balancing processing loads among a group of computing devices,
limiting usage of computing devices to particular customers or data subject to export restrictions,
identify by the coordinating controller, using the generated control solution, one or more changes to one or more of the computing devices using the first and second information; and
output third information to a second controller identifying the one or more changes for generating control signals for altering operation of various computing devices.

10. The apparatus of claim 9, wherein the at least one processing device is configured to output the information identifying the one or more changes to a controller that is configured to implement the one or more changes.

11. The apparatus of claim 9, wherein the third information includes one or more of:
information identifying which computing devices should change operating mode; and
information identifying which computing devices to or from which processing loads should be moved.

12. The apparatus of claim 9, wherein the at least one processing device is configured to identify the one or more changes that at least one of:
reduce an overall power consumption of the computing devices and the one or more building systems;
balance processing loads on the computing devices; and
move processing loads from some of the computing devices to others of the computing devices.

13. The apparatus of claim 9, wherein the apparatus comprises a multivariable controller, the multivariable controller configured to operate as a supervisory control layer over at least one other controller and to use the second information to partially control the at least one other controller.

14. A non-transitory computer readable medium containing computer readable program code that, when executed, causes at least one processing device to:
obtain first information associated with control of multiple computing devices, the first information related to possible changes to processing tasks performed by the computing devices wherein the first information includes one or more of:
information identifying which computing devices are available to enter a standby mode of operation;
information identifying how much computing power is available; and
information identifying priorities and constraints on where and when the processing tasks are to be executed by the computing devices;
obtain second information associated with building infrastructure operations performed by one or more building systems of one or more buildings that house the computing devices wherein the second information includes one or more of:
information identifying thermal loads placed on different thermal management or cooling systems associated with the computing devices;
information identifying heating, ventilation, and air conditioning (HVAC) loads for different areas of the one or more buildings; and
information identifying power loads of the computing devices or of different groups of computing devices;
generate a control solution using economic optimization including one or more steps, the steps comprising:

solving the control solution while minimizing energy consumption, moving processing loads away from computing devices that are near, at, or over some constraint or balancing processing loads among a group of computing devices, limiting usage of computing devices to particular customers or data subject to export restrictions, identify by the coordinating controller, using the generated control solution, one or more changes to one or more of the computing devices using the first and second information; and output third information to a second controller identifying the one or more changes for generating control signals for altering operation of various computing devices.

15. The non-transitory computer readable medium of claim 14, wherein the third information includes one or more of:

information identifying which computing devices should change operating mode; and information identifying which computing devices to or from which processing loads should be moved.

16. The non-transitory computer readable medium of claim 14, wherein the computer readable program code, when executed, further causes the at least one processing device to operate as a supervisory control layer over at least one controller and use the second information to partially control the at least one controller.

* * * * *